United States Patent [19]
Whalen et al.

[11] Patent Number: 5,422,321
[45] Date of Patent: Jun. 6, 1995

[54] COMPOSITION AND PROCESS FOR MAKING AN ENGINE VALVE

[75] Inventors: Thomas J. Whalen, Ann Arbor; Walter Trela, Trenton; Samuel S. Shinozaki, Livonia; John R. Baer, Carleton, all of Mich.

[73] Assignee: Ford Motor Company, Dearborn, Mich.

[21] Appl. No.: 113,566

[22] Filed: Aug. 27, 1993

Related U.S. Application Data

[63] Continuation-in-part of Ser. No. 842,865, Feb. 27, 1992, abandoned.

[51] Int. Cl.$^6$ .......................................... C04B 35/565
[52] U.S. Cl. ........................................ 501/89; 501/88; 501/90; 123/188.1; 123/188.3
[58] Field of Search ............... 501/87, 88, 89, 154; 264/63; 123/188.1, 188.3

[56] References Cited

U.S. PATENT DOCUMENTS 4,041,117 8/1977 Prochazka ............................. 264/63
4,928,645 5/1990 Berneburg ........................ 123/188.1

*Primary Examiner*—Karl Group
*Assistant Examiner*—Michael Marcheschi
*Attorney, Agent, or Firm*—Roger L. May; Joseph W. Malleck

[57] ABSTRACT

The present invention discloses a composition for a valve of an advanced heat engine. The valve comprises grains of aluminum-doped silicon carbide. The grains are of two main types: (1) a matrix of equi-axed grains of alpha and beta SiC for optimum distribution of mechanical properties; and (2) elongated grains of alpha SiC which are distributed within the matrix for reinforcement. The invention also comprises a process for making such valves. The process begins with a powder of aluminum-doped beta-silicon carbide. A binder and a solvent are then added to the powder, and the mixture is agitated while being heated. The mixture is then transferred to an injection mold which is used to form a molded component. The molded component is then sintered and machined into desired dimensions. An annealing step is then performed so that the component exhibits the characteristics of improved strength and toughness.

16 Claims, 4 Drawing Sheets

COMPOSITION AND PROCESS FOR MAKING AN ENGINE VALVE

CROSS-REFERENCE TO RELATED APPLICATION

This application is a continuation-in-part of U.S. application Ser. No. 07/842,865, filed Feb. 27, 1992, now abandoned entitled "Composition and Process for Making an Engine Valve".

TECHNICAL FIELD

The present invention relates generally to a ceramic composition of matter that may be formed into components for use in advanced heat engines. More particularly, the present invention relates to a method of preparing an aluminum-doped silicon carbide ceramic that may be used to form components, such as valves in those engines.

BACKGROUND ART

The operating environment created in advanced heat engines—like those to be found in the automobiles of tomorrow and aircraft capable of long distance, supersonic transfer—demands much from the components of such engines. To operate effectively under prolonged high stress—high temperature environments requires materials of high strength and reliability. Also, such materials may have complex shapes, and should be capable of mass production on an economically sound basis.

To satisfy such exacting operating and manufacturing criteria, efforts have been made to develop materials, like ceramics, which can operate reliably under stress at temperatures up to about 1500° C. Such materials must have performance characteristics and properties which exceed those required to satisfy operating needs demanded by today's automobile, in which operating temperatures may approach about 800° C.

To meet related design challenges, a need has arisen to develop high strength, high reliability ceramic materials, with the potential to form complex shapes which are suitable for components to be used in advanced heat engines. The fabrication method to be used should be adaptable to the mass production of complex parts on an economically sound basis.

Silicon carbide is one potential high temperature engineering material. Silicon carbide is one of the most available carbides, and its properties have long made it one of the most useful. Unlike many other carbides, however, silicon carbide is not easily sintered to produce a desirable result. This is probably explained in part by silicon carbide existing in many crystalline modifications which can be grouped in either an hexagonal or rhombohedral alpha SiC, or a cubic beta SiC, or a mixture of the alpha and beta forms. Structural complexity and heterogeneity results from the numerous stacking sequences which are possible in SiC crystals. For related reasons, silicon carbide has not easily been sintered to densities approaching those which are theoretically possible.

Another challenge offered by silicon carbides arises from transformation of the beta- to the alpha structure. During that transformation, large plate-like crystals of alpha SiC can occur in a matrix of fine grained beta SiC. Additionally, with alpha SiC material, discontinuous grain growth can be observed under unfavorable sintering conditions or if care is not taken to select dopants carefully.

As is now known, certain dopants or additives may have a significant effect on grain growth and consequent characteristics of the resulting material. Exaggerated, uncontrolled grain growth, for example, may produce anisotropy and have an undesirable effect on the mechanical properties of the resulting material.

Against a background of many experiments which have shown that pure SiC cannot sinter, even beginning with a sub-micron fine powder under normal sintering conditions, the quest for identifying and selecting appropriate additives has been pursued for some time.

The use as engine components of ceramic materials such as silicon carbide has been reported in JA-151708 which was published on Dec. 6, 1980. That reference discloses a valve guide for an internal combustion engine wherein a primary design criterion is wear-resistance, the valve guide consisting of silicon carbide or nitride.

U.S. Pat. No. 4,881,500 which issued on Nov. 21, 1989 discloses a poppet valve made of ceramic such as silicon nitride or sialon. That reference describes valve operating conditions which are different from those contemplated by the present invention. In the valve of that reference, there generally is a relatively low thermal conductivity. Therefore, areas of localized heat intensity may develop which require alleviation by reshaping the valve surface.

U.S. Pat. No. 4,928,645 which issued on May 29, 1990 discloses a ceramic composite valve for internal combustion engines. That reference discloses ceramic sleeving of strands and fibers which may result in anisotropic properties and probable failure.

SUMMARY OF THE INVENTION

The present invention discloses a composition of matter that may be formed into an engine component, for example, a valve suitable for deployment in an advanced heat engine. The composition comprises grains of aluminum-doped silicon carbide. The grains are of two main types: (1) a matrix of equi-axed alpha and beta grains of silicon carbide for optimum distribution of mechanical properties; and (2) elongated grains of alpha silicon carbide which are distributed within the matrix for reinforcement. The elongated grains tend to arrest or deflect crack propagation.

The invention also comprises a process for making such a composition. The process begins with a fine powder of aluminum-doped beta-silicon carbide and boron and carbon. A binder and a solvent are then added to the powder, and the mixture is agitated while being heated. Agitation effectively distributes the ingredients, while heating dissolves the binder and dries the mixture. The mixture is then transferred to an injection mold, which is used to form a molded bar. Typically, the injection molding step is undertaken at low pressure (less than 80 psi). After de-waxing in vacuuo, the molded bar is sintered under carefully controlled conditions and machined into the dimensions desired for an engine component—for example, an engine valve. An annealing (heat treating) step is then performed—again under carefully controlled conditions—so that the component exhibits the characteristics of improved strength and toughness.

Other attributes of the invention will be discussed in and understood from the following brief description of the drawings and best modes for practicing the invention.

BRIEF DESCRIPTION OF DRAWINGS

FIG. 2 illustrates the distribution of elongated grains throughout the matrix of equi-axed grains;

DETAILED DESCRIPTION OF THE BEST MODE(S) FOR PRACTICING THE PRESENT INVENTION

This detailed description begins with a discussion of the ceramic composition of matter of the present invention which may be formed into components for an internal combustion engine—for example, a valve—before turning to a detailed description of the process for making this composition.

1. The Composition

Figure 1:
FIG. 1 is an electron-micrograph of a section through the ceramic composition of the present invention, which may be used as a valve for an advanced heat engine. This figure shows a matrix of equi-axed grains within which are distributed elongated grains.
Figure 2:
FIG. 2 is a second electron-micrograph of the present invention, which is taken at a lower magnification than FIG. 1. Covering a broader field of view.
Figure 3:
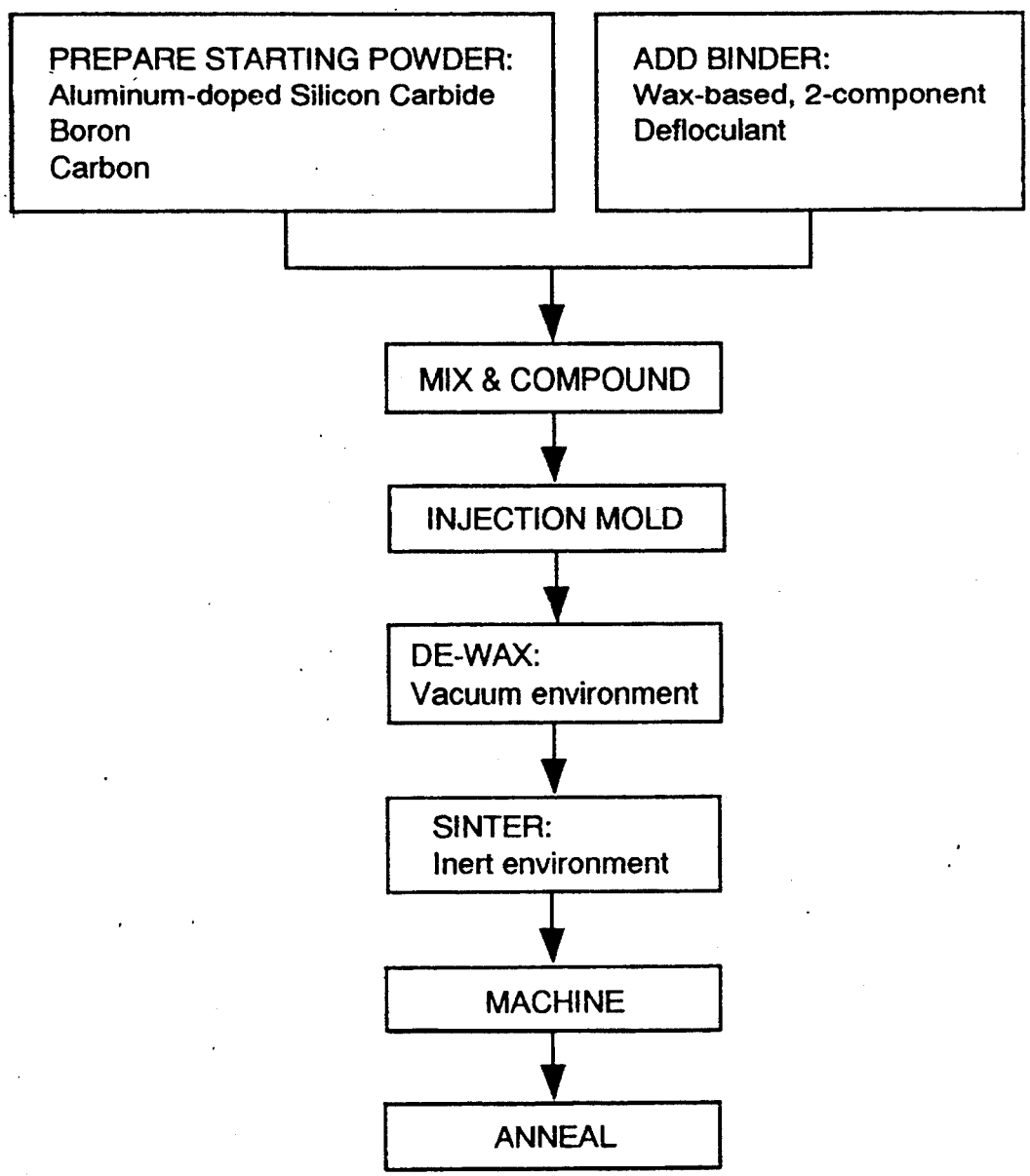
FIG. 3 is a flow diagram of the process disclosed by the present invention, illustrating the main steps involved therein.

FIGS. 1 and 2 depict grains of silicon carbide which include an effective amount of dissolved aluminum for grain growth. Aluminum doping is effective because aluminum acts as a grain-growth inhibiting aid during sintering. Inspection of FIGS. 1-2 reveals a matrix of equi-axed grains for optimum distribution of mechanical properties within which are embedded elongated, needle-like grains for reinforcement. The elongated grains function in a manner which is analogous to that of fibers embedded within fiber-reinforced materials.

Preferably, the grains of silicon carbide comprise about 0.35 weight percent of aluminum.

With particular reference to FIG. 1, it can be seen that the matrix of equi-axed grains comprises grains of alpha and beta SiC having an average diameter of about 1-5 microns. In contrast, the elongated grains are pure alpha SiC grains having an average length of about 20-50 microns and an average width of about 1-5 microns. Preferably, the elongated grains have an average length of about 20-50 microns and an average width of about 1-3 microns.

The composition depicted in the electronmicrographs of FIGS. 1-2 has the characteristic of being light in weight, with a density of 3.2 to 3.5 grams per cubic centimeter. This characteristic permits improved fuel economy in the internal combustion engine. Such densities are less than one-half of those exhibited by most steels. Additionally, the composition's morphology allows it to operate under stresses imposed by the internal combustion engine for prolonged periods without deformation under operating temperatures up to 1500° C. Even in such an environment, a valve made in accordance with the present invention has the characteristic of stiffness, with an elastic modulus of up to 60 million psi while retaining its strength. Experiments have shown that such a valve exhibits strengths in transverse rupture of up to 80,000 psi. In part, these characteristics are explained by brittle fracture theory, which postulates a linear relationship between fracture strength and the reciprocal square root of the grain size.

To assist in controlling the proportion of elongated grains distributed within the matrix of equi-axed grains, effective amounts of boron have been added to the aluminum-doped beta SiC. In practice, the amount of boron typically does not exceed about 0.5 weight percent.

The disclosed structure also has the attribute of high thermal conductivity, which tends to promote a uniform distribution of heat throughout its structure. As a result, areas of localized heat intensity tend to be avoided and (other things being equal) average lower operating temperatures are possible.

The electron-micrographs of FIGS. 1-2 were taken with the aid of an electron microscope operated at an electron acceleration voltage of 200 kilo-volts. FIG. 1 depicts a specimen having a thickness of less than 2000 Angstroms, which is magnified 5000 times. The light area at the top of FIG. 1 illustrates where the specimen is open and a hole has developed during the thinning process.

FIG. 2 illustrates the relatively dense packing of equi-axed particles which comprise the matrix of the material disclosed in the present invention. As noted earlier, the dense population of relatively small equi-axed particles contributes to the high strength of the resulting material. If a crack propagates through the matrix, it may proceed until it impinges upon an elongated grain. When a fracture line intersects with an elongated grain boundary, propagation is arrested or deflected. Failure may therefore be avoided.

Within the micro-structure of the aluminum-doped silicon carbide, inspection of FIGS. 1-2 confirms that the grains of silicon carbide are oriented at random. This random morphology produces relatively isotropic properties in the resulting structure.

The matrix of equi-axed grains includes a mixture of alpha and beta silicon carbide for optimum distribution of mechanical properties.

Within the equi-axed area, there is less than about 10% by volume of the beta phase within the alpha and beta SiC grains. If there is more than 10% of the beta phase, then the mechanical properties of the resulting microstructure change adversely. The elongated grains are of alpha silicon carbide which are distributed within the matrix for reinforcement. The elongated grains of alpha silicon carbide comprise a single polytype structure (about 98% 4H). The alpha form of silicon carbide can assume more than 100 species of polytype. In the disclosed microstructure, the single polytype structure assumes either the 4H, or 6H, or (rarely) the 21R polytype.

The inventors have discovered that an effective amount of aluminum contributes to promoting beta-to-alpha phase transformation and the growth of a single polytype of alpha SiC. Such grains are comprised of a single crystal of pure alpha SiC, which may have an hexagonal or rhombohedral structure. In contrast, the equi-axed grains of silicon carbide include the beta phase which is typically face-centered cubic (FCC) in structure. There is only polytype of the beta phase (FCC-cubic).

This description now turns to a method for making the above-described composition of matter.

2. The Method

The method of the present invention calls for the provision of a starting powder of beta silicon carbide which is doped with aluminum. This powder is of ultrafine grade, having an average grain size of less than 1 micron. It is available from such suppliers as Ibiden Company of Japan or from the Superior Graphite Company, Chicago, Ill. The powder contains up to about 1 percent by weight of aluminum, preferably about 0.35 weight percent aluminum. In the starting powder, the average particle is generally spherical and has a diameter of about 0.27 microns. Most particles contain 1 grain of aluminum-doped beta silicon carbide, and are relatively homogeneous in both size and shape. If desired, before compounding, the powder can be subjected to a dry milling step for deagglomeration and homogenization. The surface area of the silicon carbide powder occupies about 22.3 $m^2/gm$.

To the powder is added carbon, which is available as lamp black carbon #10 from Monsanto. It has a mean particle size of about 5.62 microns, with a surface area of about 53.1 $m^2/gm$. The primary function of the carbon is to eliminate oxygen and oxides from the silicon carbide and produce a fresh silicon carbide surface.

To complete the assembly of starting powders, amorphous boron—supplied by Herman C. Stark Berlin—is added. This ingredient has a mean particle size of about 2.33 microns, and a surface area of about 12.1 $m^2/gm$. The relative proportions of SiC:C:B are about 97.0:2.6:0.4 weight percent respectively.

To these solids, a binder is added. The binder is wax-based, with two components (paraffin and carnauba), and a defloculant. Binders of high and low molecular weight polymeric organic substances can be used. Typically they have a melting interval between 50° and 150° C. To customize a given binder system, components can be selected from such materials as thermal plastics (e.g., polystyrene, polyethylene, polypropylene, etc.); lubricants (e.g., paraffin, esterwax amidewax, PE-wax, stearic acid, metal stearics, etc.); resins (e.g., collophonium, alkyed-based resins); plasticizers (e.g., dibutylphthalate, dioctylphthalete); and surfactants or coupling agents (e.g., such as organotitanates). The loading of the molding mixture by solids and binder is such that about 58 volume percent is occupied by solids, which amounts to about 83 weight percent.

The starting powder, binder, and defloculant are then mixed together in a batch attriting mill using a fluid such as toluene for dissolving the wax binder. Preferably, the mixing process calls first for heating the mill media (commercially available 6.25 millimeter diameter SiC balls), toluene (supplied by the Fisher Scientific Company as T324-4 toluene), and waxes. The dry powders are then added into the mill, which is operated for about 90 minutes at constant speed. Additional solvent is introduced near the end of the mixing step to thin the slurry for draining. The slurry is then pan-dried, homogenized, and transferred into a low pressure molding machine.

The mixing process affects the strength of the sintered silicon carbide. Preferably, a fluid mixing process is used wherein the ingredients are mixed in toluol as the fluid and the molding waxes are introduced as a solution in toluol. Stir drying and pan drying tend to remove the fluid, and a small wax addition is made at the end of the step to achieve the correct loading of solids.

The molding step calls for a low pressure injection technique, because this forming technique also affords the capability of mass production of ceramic parts in a near-net shape quality. This may obviate the need for extensive and expensive post-machining steps.

After molding, the bars are radiographically inspected for voids and inclusions. The molded bars are then dewaxed and embedded in activated charcoal in a vacuum furnace under a maximum temperature of about 288° C. After this step, the mixture of aluminum-doped silicon carbide, carbon, and boron is quite fragile.

The objective of the dewaxing step is to remove the wax necessary for the injection molding step without causing fracture or chemical change of the material to be sintered. Generally, a vacuum dewaxing step is preferable to dewaxing in an inert gas environment. This is because oxidation of the silicon carbide and carbon powders is more easily controlled and avoided in a vacuum than in an inert gas atmosphere. Generally, the dewaxing cycle may last four days at a maximum temperature of 300° C.

Experimentation has shown that the sintering cycle developed for boron and carbon-doped silicon carbide is not acceptable for aluminum-doped SiC. If uncontrolled, the sintering cycle may result in exaggerated grain growth, which is often large enough to be visible to the naked eye.

Figure 4:
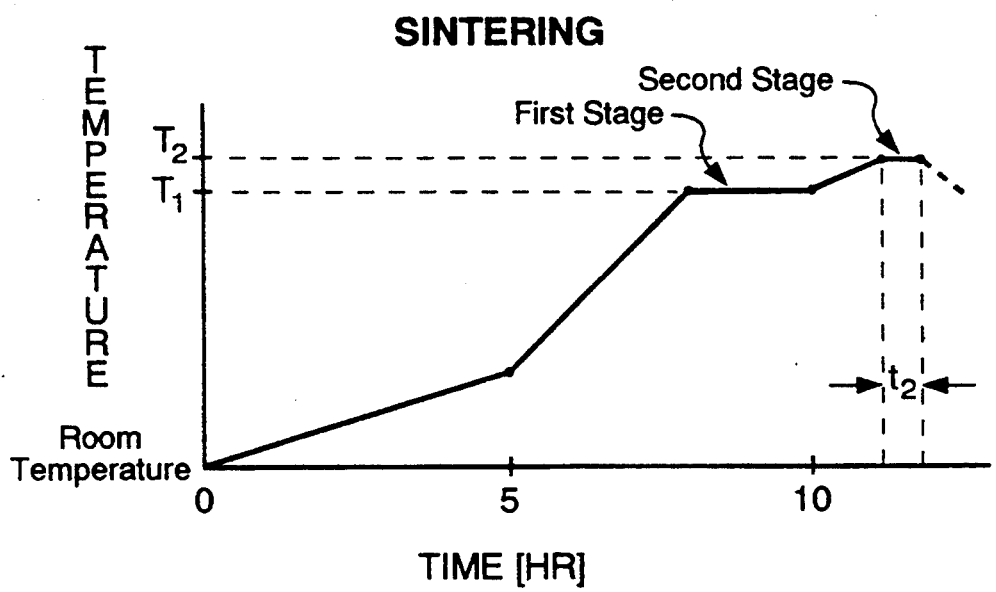
FIG. 4 is a graph of temperature versus time during which sintering occurs.

FIG. 4 illustrates the sintering cycle. During that cycle, a specimen is heated in an inert environment up to a first stage temperature ($T_1$), at which it is retained for about two hours. Thereafter, the specimen is heated to a second stage temperature ($T_2$), at which it is retained for a second stage hold time ($t_2$). In one sintering cycle, the second stage hold temperature was about 2075° C. While this eliminated the large visible grains, density dropped from 99 to 96 percent.

To produce components—for example, valves—having characteristics which are suitable for the environment of an advanced heat engine, studies were also made of the annealing cycle, since proper post-sintering heat treatment (annealing) can increase the strength of the resulting material. During the annealing step (FIG. 5), internal stresses are generally relieved without further grain growth. Strength improvements in the range of 15–20 percent can be realized by carefully controlled annealing. The mechanism by which the strength of the sintered bars improves upon heat treatment involves oxidation of the surface to reduce the severity of surface flaws and provides for a greater probability of initiating fracture at internal flaws instead of at the surface.

Figure 5:
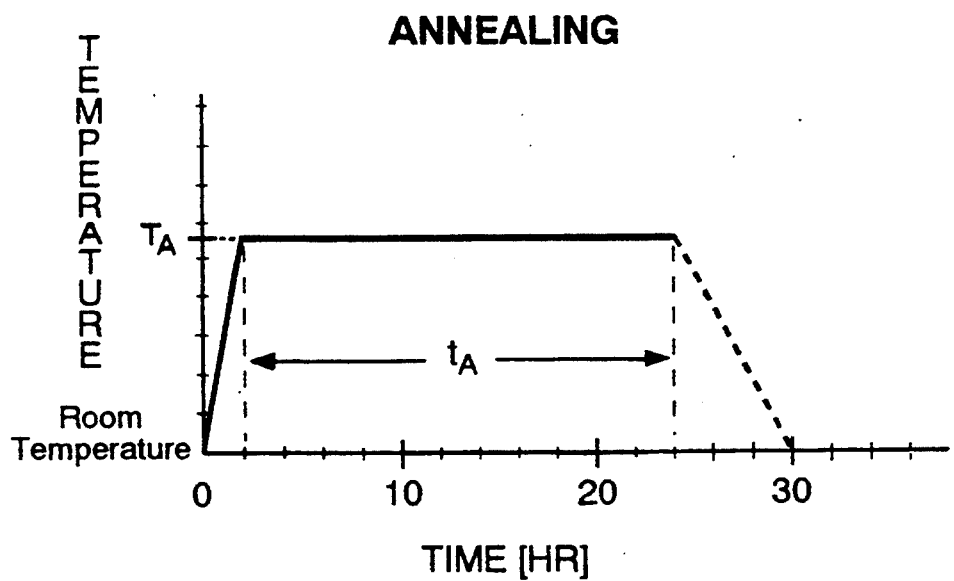
FIG. 5 is a graph of temperature versus time which depicts an annealing step.

In an attempt to isolate the critical process parameters, five factors were studied in a fractional factorial designed experiment: first and second stage sintering temperatures ($T_1$, $T_2$, see, FIG. 4); the second stage sintering time ($t_2$; see FIG. 4); and the annealing temperature and time ($T_A$, $t_A$; see FIG. 5). Analysis of the experimental data revealed that of the five factors evaluated, only the second stage sintering time ($t_2$), temperature ($T_2$), and annealing temperature ($T_A$) had a significant effect on strength.

During the sintering and annealing steps, the beta SiC powder is quickly transformed from cubic SiC to the rhombohedral (15R) or hexagonal (4H or 6H) alpha SiC material. Within the material, the aluminum addition promotes the formation of a few isolated, slightly elongated grains. In contrast, without the aluminum, a uniform distribution of fine grains results.

With particular reference to FIG. 4, there is depicted a preferred relationship between temperature and time during the sintering step. Dewaxed bars are taken from room temperature in a vacuum to about 1815° C. ($T_1$)

over about an eight-hour period. The environment is then changed from vacuum to an argon atmosphere to prevent disassociation of the silicon carbide at the surface. Typically, this first stage spans about a two-hour period. At the end of the first stage, the dewaxed bars are heated further to a second stage temperature ($T_2$) of about 2185° C. where they are maintained for a second stage time of about one hour ($t_2$).

The sintering step is followed by cooling in a furnace under an inert atmosphere for about 12 hours. Following cooling, the sintered bar is evaluated by X-ray radiography. If necessary or desired, the component may be machined to the desired dimensions and re-tested.

FIG. 5 illustrates a typical annealing cycle. In a preferred annealing cycle, sintered bars are heated to a temperature of about 1000°–1100° C. Typically this annealing temperature ($T_A$) is about 600°–700° C. lower than the first stage sintering temperature ($T_1$).

The sintered material is maintained at the annealing temperature ($T_A$) for 9–25 hours.

By experiment, it was determined that raising the second stage sintering temperature ($T_2$) from 2032° to 2138° C. will increase the modulus of rupture (MOR) on average by about 7250 psi. Increasing the second stage sintering time ($t_2$) from 18 to 42 minutes increases the MOR on average by about 4350 psi. Decreasing the annealing temperature ($T_A$) from 1300° to 1100° C. increases the MOR on average by about 5365 psi.

This work has also shown that the first stage sintering temperature ($T_1$) can be changed from 1652° C. to 1893° C. with no effect on the MOR. The annealing time ($t_A$) can also be changed from 9 to 25 hours with no change in strength.

Subsequent tests have shown that the composition prepared by the above-described process exhibits the characteristic of stiffness, with an elastic modulus of up to 60 million psi and has strengths in transverse rupture of up to 80,000 psi.

As indicated earlier, the process parameters which have the most significant effect on MOR are $T_2$, $t_2$, and $T_A$.

In light of the above disclosure, it can be seen that the ceramic composition of the present invention comprises a duplex structure of elongated grains in a uniform matrix of equi-axed grains of silicon carbide. This micro-structure results in a composition having improved strength and toughness over other known materials which may be suitable for use in advanced heat engines. The morphology of the resulting material includes elongated grains which function in a manner which is analogous to that of fibers which are present in fiber-reinforced materials.

The materials produced by the disclosed process may be the strongest, most stable materials known at elevated temperatures (about 1500° C.) in air which are capable of being formed into complex parts.

Thus there has been disclosed a composition of matter and process for making such a composition which preferably may be used to form components or parts—for example, an engine valve—of an advanced heat engine.

While it has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the following claims.

We claim:

1. An engine valve comprising:
   grains of silicon carbide with an effective amount of aluminum for promoting beta to alpha phase transformation, the grains including a
   matrix of equi-axed grains of alpha and beta silicon carbide for optimum distribution of mechanical properties; and
   a plurality of needle-shaped grains of alpha silicon carbide comprising a single polytype of alpha silicon carbide randomly distributed within the matrix for reinforcement, the needle-shaped grains tending to arrest or deflect crack propagation.

2. The valve of claim 1, wherein the matrix of equi-axed grains comprises grains having an average diameter between 1–5 microns.

3. The valve of claim 1, wherein the plurality of needle-shaped grains comprises grains having an average length of between 20–50 microns.

4. The valve of claim 1, wherein the plurality of needle-shaped grains comprises grains having an average width of between 1–5 microns.

5. The valve of claim 1, further comprising up to 0.5 weight percent boron and traces of carbon for controlling the proportion of elongated grains distributed within the matrix of equi-axed grains.

6. The valve of claim 1, the valve having a density in the range of less than 3.5 grams per cubic centimeter for improved fuel economy in the engine.

7. The valve of claim 1, wherein the grains of silicon carbide comprise about 0.35 weight percent of aluminum.

8. The valve of claim 1 having an elastic modulus of up to 60 million psi, together with strengths in transverse rupture of up to 80,000 psi.

9. A composition of matter comprising,
   grains of silicon carbide with an effective amount of aluminum for promoting beta to alpha phase transformation, the grains including a
   matrix of equi-axed grains of alpha and beta silicon carbide for optimum distribution of mechanical properties; and
   a plurality of needle-shaped grains of alpha silicon carbide comprising a single polytype of alpha silicon carbide randomly distributed within the matrix for reinforcement, the needle-shaped grains tending to arrest or deflect crack propagation.

10. The composition of claim 9, wherein the grains of silicon carbide include about 0.35 weight percent of aluminum.

11. The composition of claim 9, wherein the matrix of equi-axed grains comprises grains having an average diameter between 1–5 microns.

12. The composition of claim 9, wherein the plurality of needle-shaped grains comprises grains having an average length of between 20–50 microns.

13. The composition of claim 9, wherein the plurality of needle-shaped grains comprises grains having an average width of between 1–5 microns.

14. The composition of claim 9, further comprising up to 0.5 weight percent boron and traces of carbon for controlling the proportion of needle-shaped grains distributed within the matrix of equi-axed grains.

15. The composition of claim 9, the valve having a density in the range of less than 3.5 grams per cubic centimeter for improved fuel economy in the engine.

16. The composition of claim 9, wherein the plurality of needle-shaped grains of alpha silicon carbide comprise a single polytype of alpha silicon carbide including up to 98% of the 4H polytype.

* * * * *